United States Patent [19]

Seibel

[11] 4,072,097
[45] Feb. 7, 1978

[54] LITTER DISPOSAL DEVICE FOR AUTOMOBILES

[76] Inventor: Arthur H. Seibel, Rte. No. 3, Red Lake Falls, Minn. 56750

[21] Appl. No.: 697,471

[22] Filed: June 18, 1976

[51] Int. Cl.$^2$ .............................................. B30B 15/30
[52] U.S. Cl. ................................. 100/100; 15/104.16;
15/104.2; 100/215; 198/736; 198/748;
296/37.8; 296/37.11
[58] Field of Search ................ 224/29 J, 29 H, 42.41;
296/37.9, 37.11; 15/104.06, 104.16, 104.2, 313;
100/215, 100, 240; 198/716, 736, 747, 748;
131/256; 243/38; 214/17 D, 41 A

[56] References Cited

U.S. PATENT DOCUMENTS

| | | | |
|---|---|---|---|
| 1,611,437 | 12/1926 | Hardesty | 15/313 X |
| 2,074,213 | 3/1937 | Deem | 15/104.2 |
| 2,558,255 | 6/1951 | Johnson | 296/37.11 X |
| 2,680,569 | 6/1954 | Nicholas | 15/313 X |
| 2,756,866 | 7/1956 | Wilde | 198/716 X |
| 2,764,281 | 9/1956 | Mendenhall | 296/37.11 X |
| 3,243,054 | 3/1966 | Petersen | 100/215 X |
| 3,292,198 | 12/1966 | Perkel | 15/104.16 |
| 3,419,209 | 12/1968 | Munn | 243/38 X |
| 3,688,686 | 9/1972 | Ligh | 100/215 |
| 3,929,060 | 12/1975 | Burke | 100/245 X |

Primary Examiner—Trygve M. Blix
Assistant Examiner—Winston H. Douglas
Attorney, Agent, or Firm—Merchant, Gould, Smith, Edell, Welter & Schmidt

[57] ABSTRACT

There is disclosed an improved litter disposal device for use on vehicles including automobiles. The litter disposal device permits the occupants of the automobile or other vehicle to dispose of litter through access ports in the interior of the passenger compartment of the automobile or other vehicle. The interior access ports open into a litter conduit conveyor system mounted along the under carriage of the automobile. Once the litter is deposited into the conduit, it is conveyed through the conduit by the operation of a wiper plug in the conveyor which is electromechanically movable from the forward end of the conveyor to the open rearward end of the conveyor. The litter is deposited into an accumulation receptacle which is positioned, typically, within the trunk compartment of the automobile. The accumulation receptacle is provided with an access door for easy removal of the litter when the receptacle is full. Further, the receptacle is provided with an electrically or hydraulically actuated compressor which compacts the litter.

3 Claims, 2 Drawing Figures

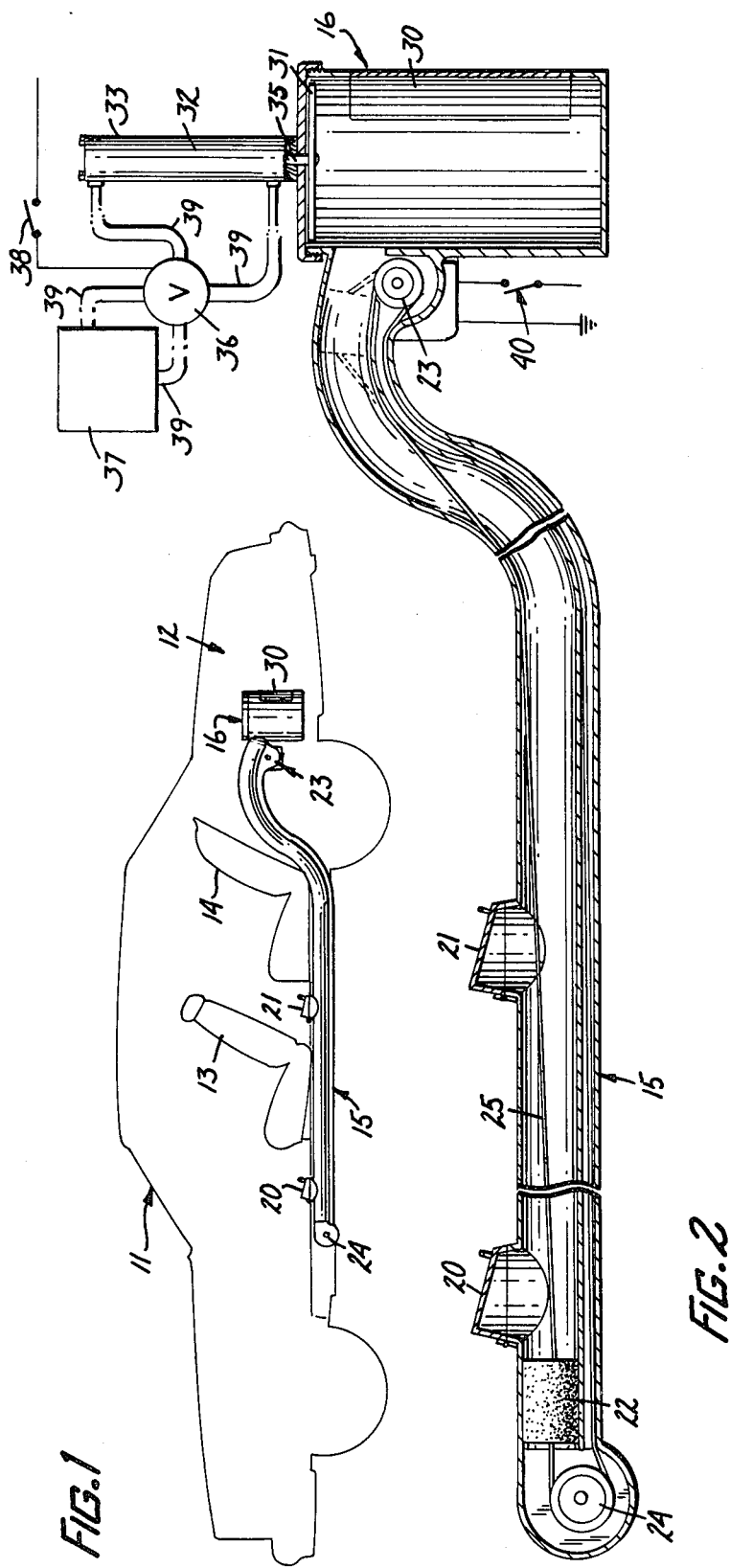

LITTER DISPOSAL DEVICE FOR AUTOMOBILES

BACKGROUND OF THE INVENTION

Field of the Invention

The present invention generally concerns disposal systems and more specifically relates to litter disposal devices for automobiles or other vehicles.

Prior Art

Disposal of litter from automobiles and other vehicles is a serious problem. Generally the litter problem in vehicles is solved in one of two ways. The passengers or occupants of the vehicle either throw the litter out of the automobile which is aesthetically and environmentally unpleasant, or the litter is simply dropped on the floor of the vehicle. The presence of a handy litter disposal device in our automobiles which is convenient and easily operated will eliminate the temptation to throw the litter out of the window or to let it accumulate in the interior of the passenger compartment.

Litter disposal devices for automobiles, airplanes, and trans have been known in the prior art for a considerable period of time. These devices have embraced a wide variety of specific design and functional features. As early as 1926 simple automobile disposal devices were known. For example, in Hardesty, U.S. Pat. No. 1,611,437, there was disclosed a smoker's appliance for automobiles which evacuated the ash from tobacco products from the interior of the automobile to the exterior of the automobile. In this particular device, ashes were deposited in a receptacle in the interior of the automoble and were evacuated to the exterior of the automoble by a manifold assisted exhaust. Although this disposal device did not accommodate forms of litter other than ashes, subsequent devices did. In 1961, vacuum assisted waste disposal devices were developed for disposal of larger forms of litter. For example, U.S. Pat. No. 3,011,627 disclosed a vacuum actuated apparatus for receiving and depositing within a vehicle trash and refuge including ashes, cigarette butts, cigar stubs, cleansing tissues, paper napkins, and the like. In this particular device, a receptacle was placed in the interior of the automobile along the dashboard thereof and a receptacle for receiving the trash was connected thereto and was positioned in the engine compartment of the automobile. Whereas this particular device did accommodate litter other than ashes, it did not provide for bulkier, heavier litter such as cans, fruit cores, and the like.

Subsequent to this development, however, improved litter disposal devices for automobiles were developed that did accommodate bulkier litter. Examples of these improved devices include Frost, U.S. Pat. No. 3,113,665, Frost, 3,235,064, and Beil et al, 3,250,382. These devices all embodied a variety of specific design feature but all have in common the functional characteristic of vacuum assisted operation. In fact, litter disposal devices developed in recent years have for the most part employed a vacuum assisted operational feature. One of the more recent developments in litter disposal devices, as disclosed in Ogle, U.S. Pat. No. 3,648,837, issued Mar. 14, 1972, embraces a litter evacuating device for disposal of tobacco products as well as heavy and bulky litter which is again a vacuum assisted device. Although this and other vacuum assisted devices do function, it is not without the potential for malfunctions and other problems. For example, in disposal of heavier items, a vacuum assisted device must generate a substantial suction to properly convey the litter from the interior receptacle to the evacuation receptacle. Hence, a more suitable device would utilize a positive conveyor for transporting the litter from the interior of the automobile to the litter accumulation receptacle. The device of the present invention provides such a positive conveyance system.

In the present invention, litter is transported from the interior of the automobile to the litter accumulation receptacle by the action of a conveyor device which positively carries the litter along a conveyor conduit to the litter accumulation receptacle. Specifically, the device of the present invention includes two access ports in the passenger compartment of the interior of the automobile along the floor board thereof. These ports open into a conduit which houses the litter conveyor system. The litter conveyor system includes a resilient wiper plug which is diametrically sized to engage the interior walls of the cylindrical conduit but which remains readily movable therein. The wiper plug is connected to one or more electromechanical motors by a cable which pulls the wiper plug through the conduit thereby moving the litter along the interior of the conduit to the litter accumulation receptacle in the trunk of the automobile. The litter accumulation receptacle includes a hydraulically or electrically actuated compressor member wich serves to compact the litter and to keep the cans, bottles, etc. therein from rattling during operation of the automobile. The electromechanical motor which drives the conveyor system is actuated by an electrical switch in the interior of the passenger compartment and which is readily accessible to the operator of the automobile. The litter accumulation receptacle in the trunk of the automobile is provided with an access door for removing the litter from the receptacle.

SUMMARY OF THE INVENTION

The present invention is a litter disposal device for automobiles which includes at least one access port positioned within the interior of the passenger compartment providing access to a litter conveyor conduit into which litter is inserted. The litter conveyor conduit houses a conveyor system which includes a wiper plug, an attached cable, and a reversible electromechanically actuated winch. The litter conveyor conduit empties into a litter accumulation receptacle which includes a litter compactor-retainer and an access door thereon for removal of the litter when the receptacle is full.

BRIEF DESCRIPTION OF THE DRAWINGS

FIG. 1 is a view in perspective of the present invention as installed in a typical automobile; and FIG. 2 is a view in cross section of a first embodiment of the present invention.

DETAILED DESCRIPTION OF THE DRAWINGS

The litter disposal device of the present invention is shown in FIG. 1 in a preferred configuration of installation in a typical automobile 11. In this embodiment, a litter conveyor conduit 15 is attached to and carried beneath the floor board of the passenger compartment of automobile 11. Litter conveyor conduit 15 is formed as an elongated cylindrical tube which is diametrically sized such that it will readily accomodate bulkier litter such as beverage cans or bottles. Access to the litter conveyor conduit 15 is provided through a plurality of access ports in the interior of the passenger compartment. In the embodiment shown in FIG. 1, an access port 20 is provided for the passengers in the front seat 13 of the automobile and a similar access port 21 is provided in the back seat 14 of the automobile. The access ports 20 and 21 are identical and are hingeably connected to the litter conveyor conduit 15 through openings formed in the floor board of the passenger compartment of automobile 11. The access ports 20 and 21 are constructed such that they form a tight sealing arrangement with the litter conveyor conduit 15 when closed.

The litter conveyor conduit 15 is positioned on either side of the drive shaft on most standard automobiles. However, in front wheel drive, mid-engine or rear engine automobiles, the conveyor conduit 15 can be positioned along the middle of the floor board of the automobile. The conveyor 15 is preferably formed of a durable plastic material but can be fabricated from steel, aluminum, or any other suitable material.

The litter disposal conduit 15 extends along the underside of the automobile floor board into the trunk compartment 12 of automobile 11. Depending upon the construction and design of the automobile, the configuration of the conduit 15 is variable to avoid design obstructions such as the positioning of fuel tanks, drive train, and axle. As shown in FIG. 1, the conduit 15 curves upward behind the rear passenger seat 14 and continues into the trunk compartment 12 where it is attached to the litter accumulation receptacle 16. The litter accumulation receptacle 16 can also include a compactor device for compressing the litter which is accumulated in the receptacle 16.

For removal of the accumulated litter, an access door 30 is positioned along the back of the accumulation receptacle 16 such that it is readily accessible through the trunk compartment 12 of the automobile 11. It is apparent that the positioning of the accumulation receptacle 16 within the trunk compartment 12 of the automobile 11 must depend upon the individual design and construction features of the automobile to which the litter disposal device 10 is to be installed.

Once the litter is deposited into the conduit 15 through access ports 20 or 21, it of course must be carried along the conduit 15 and deposited into the accumulation receptacle 16. To accomplish this, a conveyor system is used which includes an electrically operable motor 23 controlled by switch means 40 within the passenger compartment. Electrical motor 23 is an automatically reversible type motor which includes a winch means thereon (not shown). The motor 23 is positioned at the rearward end of conveyor 15 adjacent to the accumulation receptacle 16 and is operably engageable with a pulley system which is comprised of a pulley wheel 24, mounted at the forward most end of the conduit 15, and an endless tension cable 25 which is operably engaged with pulley wheel 24 and the winch means on motor 23. The cable 23, which is formed of a relatively flexible material, is attached to and carries a wiper plug 22. The wiper plug 22 is formed of a plastic material which is sufficiently pliable to permit the plug 22 to move readily through the conduit 15. The wiper plug 22 is diametrically sized so that it substantially covers the interior cross-sectional surface of the conduit 15. The cable 25 is attached to the wiper plug 22 off-center so that the cable 15 does not interfere with the deposit of litter through the access ports 20 and 21.

Once the litter is deposited into the conduit 15, the system is actuated by closing switch 40 which causes the motor 23 to pull the wiper plug from the forward end of the conduit 15 through the conduit forcing the litter along the interior of conduit 15 to the rearward end of conduit 15 where the litter is forced into the accumulation receptacle 16. The electrical motor 23 is a reversible type motor which automatically reverses once the wiper plug 22 reaches the rearward end of the conduit, thus returning the plug 22 to its forward position, and completing the cycle.

In the embodiment depicted in FIG. 2, the litter disposal system includes a compactor means 32 on the accumulation receptacle 16. It is preferable to use a compacting feature for several reasons. First, it is apparent that the amount of litter that can be accumulated in the receptacle 16 is increased by compressing the litter to make room for additional accumulation. Secondly, in a compressed state, the litter is less likely to rattle in the receptacle 16 causing distracting noises. As shown in FIG. 2, the litter accumulation receptacle 16 includes a hydraulically actuated compactor means 32 at the top thereof. Housing 33 includes the hydraulically actuated ram cylinder 35 therein which is downwardly extending through the top of the receptacle 16 where it is connected to a press plate 31. In the actuated condition, the hydraulic cylinder 35 is extended downwardly through the top of the receptacle 16 carrying the press plate 31 downwardly into the receptacle 16 where it engages and compacts the accumulated litter. As stated previously, the compactor means is hydraulically actuated by a hydraulic assist means such as the power steering system or power brake system of the automobile. As depicted in FIG. 2, there is shown the schematic design of the hydraulic system for actuating the compactor means 32. A hydraulic source 37, such as the power steering or power brake system of the automobile, is connected to the compactor means 32 by a plurality of hoses 39 and a valve 36 controlled by a switch 38 which is positioned within the passenger compartment of automobile 11 within easy reach of the vehicle operator.

The compacting means of the accumulation receptacle 16 could also be electrically operable instead of hydraulically actuated. In this case, the hydraulic means 32 would be replaced by a reversible electric motor powered by the electrical system of the automobile and would be designed similarly to the home appliance type trash compacting unit.

The compactor means 32 can be actuated after each time litter is deposited into receptacle 16 or it can be actuated after there has been substantial accumulation of litter in the receptacle.

Having fully described the present invention, it is apparent that various changes and modifications can be made to the description without departing from the scope of the appended claims.

I claim:
1. A litter disposal system for vehicles, comprising:
 a. a conveyor conduit carried by said automobile along the underside thereof which includes at least one access port thereon for communication between the interior of said automobile and the interior of said conduit;

b. a pulley wheel mounted at the forward end of said conduit, said pulley wheel being axially rotational therein;
c. a motor means operably engageable with said conduit at the rear thereof, said motor means being an automatically reversible type electrical motor, and which includes a rotationally operable wheel means thereon;
d. a tension cable which is operably engageable with said wheel means on said motor and said pulley wheel at forward end of said conduit, said tension cable being formed of a relatively flexible material;
e. a wiper plug carried by said cable within said conduit and being sized such that it substantially covers the internal cross-sectional area of said conduit, said wiper plug thereby being movable from the forward end of said conduit to the rearward end of said conduit in response to operation of said motor and being movable from the rearward portion of said conduit to the forward portion of said conduit in response to reverse operation of said motor;
f. a litter accumulation receptacle attached to the rearward portion of said conduit, said receptacle including:
  i. a compactor means thereon which is independently operable; and
  ii. an access door on said receptacle for removal of said litter from within said receptacle.

2. A materials handling system for use in a motor vehicle having a passenger compartment comprising, in combination:
   a plurality of litter receiving access ports located in said passenger compartment;
   a litter accumulating receptacle remote from said passenger compartment for receiving litter passed through said access ports;
   a conduit connected serially to said ports and said receptacle so that litter passing through said access ports is temporarily received in said conduit;
   a wiper plug reversibly movable in said conduit from a first, normal position more remote from said container than any port to a second position adjacent said receptacle;
   first reversibly actuable motor means;
   cable means driven by said motor means and having a first end entering said conduit at a pulley adjacent said receptacle and a second end entering said conduit at a pulley beyond said normal position said plug, said ends of said cable means being connected to opposite ends of said plug within said conduit, so that actuation of said motor means in a first direction causes movement of said plug to said second position, to transport litter in said conduit to said receptacle, and actuation of said motor means in the opposite direction causes movement of said plug to said first position, to withdraw said plug from the portion of said conduit between said receptacle and said ports;
   and manual means in said passenger compartment for causing actuation of said motor means.

3. A system according to claim 2 in which said receptacle comprises means including a press plate operable to cause compaction of litter transported thereto;
   and second reversibly actuable motor means connected to said press plate for causing operation thereof.

* * * * *